United States Patent [19]

Bentz

[11] Patent Number: 5,064,763

[45] Date of Patent: Nov. 12, 1991

[54] BIOLOGICAL PROCESS FOR PURIFYING WASTE AIR

[75] Inventor: Rolf Bentz, Basel, Switzerland

[73] Assignee: Ciba-Geigy Corporation, Ardsley, N.Y.

[21] Appl. No.: 329,169

[22] Filed: Mar. 27, 1989

[30] Foreign Application Priority Data

Apr. 7, 1988 [CH] Switzerland .......................... 1273/88

[51] Int. Cl.$^5$ .............................................. B01D 53/34
[52] U.S. Cl. ..................................... 435/266; 435/262
[58] Field of Search .......................................... 435/266

[56] References Cited

U.S. PATENT DOCUMENTS 4,662,900  5/1987  Ottengraf .................................. 55/90
4,806,148  2/1989  Ottenfraf .................................. 55/223

FOREIGN PATENT DOCUMENTS 2067092  7/1981  United Kingdom .

OTHER PUBLICATIONS

Derwent Publications Abstract of Japanese 146788 dated Jan. 14, 1987.
Werner Ludwig et al., Chem.-Ing.-Tech. 58(1986) NR.9, S. 742-744.
Merck Index 11th Ed., pp. 87 & 975.

*Primary Examiner*—Sam Rosen
*Attorney, Agent, or Firm*—Kevin T. Mansfield; Edward McC. Roberts

[57] ABSTRACT

The application relates to a process for the biological disposal and purification of waste air which is contaminated with hazardous substances with the aid of biofilters. The breakdown efficiency of the biofilter is increased by adding to the waste air basic compounds which are in the form of a gas or dissolved.

10 Claims, No Drawings

BIOLOGICAL PROCESS FOR PURIFYING WASTE AIR

The application relates to a process for the biological disposal and purification of waste air which is contaminated with hazardous substances with the aid of biofilters.

The breakdown of hazardous substances in biofilters is known and is used in industry and agriculture (VDI-Richtlinien 3477, DE-A 3,118,455, EP-A 142,872).

However, it has emerged that on breakdown in a biofilter, depending on the composition of the hazardous substances, in time the filter material becomes excessively acid and thus the efficiency of biological breakdown falls. If the pH in the biofilter or in the waste air which is to be disposed of falls below a pH of 5 there is a massive reduction in the efficiency of breakdown by the microorganisms. This is why attempts have been made to counteract the excessive acidity, for example by mixing solid materials such as limestone and calcium carbonate with the biofilter support material (EP-A-142,872). However, the results which can be achieved by this tend to be unsatisfactory. An additional factor is that neither pH-dependent dosage nor good distribution is possible with these materials.

It has now been found that these disadvantages surprisingly no longer occur when a basic compound in gaseous or dissolved form is added to the waste air contaminated with hazardous substances before it enters a biofilter.

Hence the application relates to a process for the biological disposal and purification of waste air contaminated with hazardous substances with the aid of biofilters, which comprises a basic compound, or mixture of basic compounds, which is in the form of a gas and/or is dissolved in a solvent being added to the contaminated waste air before entry into a biofilter. Waste air contaminated with hazardous substances is to be understood hereinafter as meaning gases, aerosols and vapours which occur, for example, in concentrated form in industrial processes or in tank farms as well as in air-diluted form in the air from rooms or in the exhausts from laboratories, manufacturing or storage sheds.

The hazardous substances in this connection are inorganic or preferably, organic compounds, for example hydrocarbons or halogenated hydrocarbons, for example alkanes or cycloalkanes having 1 to 12 carbon atoms, or aromatic compounds, aldehydes, ketones, ethers, carboxylic esters, sulfones, alcohols, thioles, esters, nitro or amino compounds or mixtures. Particular examples are, however, butane, pentane, heptane, octane, cyclohexane, cyclooctane, decalin, methylene chloride, benzene, toluene, phenol, xylene, chlorobenzene, dichlorobenzene, acetone, dioxane, sulfolane, tetrahydrofuran, methyl isobutyl ketone, methanol, ethanol, propanol, isopropanol, butanol, pyridine, dimethylformamide, acetonitrile, acrylonitrile, acrylic esters, acetoacetic esters or mixtures.

Examples of inorganic compounds which may be mentioned are $H_2S$ and HCN.

The waste air is broken down in the biofilters. These biofilters contain microorganisms, for example from activated sludge from sewage treatment plants and a support material which may, where appropriate, provide the microorganisms with nutrients.

Examples of support materials which are used are compost, peat, soil, wood chips, plant residues such as brushwood, straw, tree bark or heather, or mixtures, preferably a mixture of fibrous peat, heather and fir brushwood. It is also possible, in order to stabilize the filter volume, for the biofilters to contain in addition to these natural support materials synthetic additives such as, for example, active charcoal and polyethylene and/or polystyrene granules.

Since the microbiological breakdown takes place in aqueous phase, the support material must be moist. This is achieved, where appropriate, by a device for moistening the biofilters, preferably by the waste air being passed through a humidifier before entry into a biofilter, or by water or water vapour being sprayed through a nozzle into the stream of waste air. The amount of water used for the moistening depends on the biofilter support material and may extend to saturation of the waste air. The basic compound is added to the contaminated waste air before, after and/or at the same time as the moistening, for example by spraying in, injecting or blowing in, and is preferably metered depending on the pH, with the pH being measured in the biofilter, in the condensate, in the waste water and/or in the purified waste air after it emerges from the biofilter.

It is also possible to moisten the contaminated waste air directly with the basic compound dissolved in water, especially when the composition of the hazardous substances in the waste air, as well as the concentration thereof, is constant.

Solvents are to be understood as meaning organic solvents and, in particular, water. The organic solvents are, for example, the above-mentioned organic compounds which can be broken down by microorganisms.

The basic compounds used are alkali metal and/or alkaline earth metal hydroxides such as sodium, potassium, lithium and calcium hydroxide, as well as, in particular, nitrogen-containing compounds, for example ammonia, ammonium compounds such as basic ammonium salts and/or amines, for example mono-, di- or tri-$C_1$-$C_5$alkylamines, for example methylamine, ethylamine, dimethylamine, diethylamine and trimethylamine. Besides their basic action, the nitrogen-containing compounds have the advantage that they additionally act as nutrient for the microorganisms. Additional ammonium phosphate solution results in phosphorus being introduced as further nutrient into the filter material.

Of particular interest is a process in which gaseous ammonia or aqueous ammonia is added to the contaminated waste air after or, preferably, during the moistening. Where hazardous substances or mixtures of hazardous substances may be produced discontinuously, it is advantageous to pass the contaminated waste air through a separate buffer which is located upstream and/or downstream of the moistening device, upstream and/or downstream of the device for introducing the basic compounds—if the introduction thereof does not take place at the same time as the moistening—or else between several biofilters where appropriate.

The buffer contains an adsorbent, for example silica gel, kieselguhr, fuller's earth, aluminium oxide, bauxite, glass, ceramic and, in particular, active or bone charcoal, or mixtures in the form of granules or a powder with a particle size of 1 to 20 mm, preferably 2 to 10 mm and in particular 3 to 5 mm.

The process according to the invention is distinguished by the possibility of introducing basic compounds well distributed and in the dosage appropriate for the particular pH into the biofilter. This achieves optimal living conditions for the microorganisms and constant high breakdown efficiencies. It is also possible, owing to the use of nitrogen-containing and phosphorus-containing bases, for the microorganisms to be provided with additional nutrients.

The examples which follow explain the invention, without confining it thereto.

EXAMPLE 1

1. Apparatus.

The apparatus consists of a closed biofilter. The biofilter has a diameter of 0.12 m, a packed height of 0.9 m and a packed volume of 10 l. Compost is used as support.

A stream of air containing hazardous substances is passed through this system, with the desired concentration of hazardous substance being generated in the stream of air in the following manner:

a portion of the air is passed via a rotameter through a gas wash bottle which is filled, for example, with solvent, and the remaining volume of air is passed via a rotameter through a flask controlled by a thermostat filled with distilled water to keep the biofilter moist. The two streams of air are combined before they enter the biofilter.

The concentration of hazardous substance is monitored by FID measurement (flame ionization detector) upstream and downstream of the biofilter.

2. Experiment

The hold-up time of the air in each biofilter is 36 s. The stream of air has a temperature of 28° C. and is contaminated with isopropanol.

Throughout the period of the experiment the air volume remains approximately constant, whereas the solvent concentration in the entry air varies, as does the time during which a constant solvent concentration enters the system.

10 ml portions of 30% aqueous ammonia are added as basic compounds at various times to the water for moistening the filter material. The effect of these additions on the breakdown efficiency is evident from Table 1.

TABLE 1

| Time [h] | Entry air [m³/h] | Concentration of hazardous substance [mg/m³] | | Breakdown [%] |
|---|---|---|---|---|
| | | before | after | |
| 24.5 | 1.12 | 620 | 221 | 64 |
| 24.5 | 1.15 | 663 | 370 | 44 |
| 25 | 1.15 | 685 | 474 | 31 |
| 25 | 1.15 | 683 | 507 | 26 |
| *28.5 | 1.15 | 740 | 588 | 21 |
| 17 | 1.15 | 715 | 559 | 22 |
| 24 | 1.15 | 487 | 45 | 91 |
| 24 | 1.15 | 609 | 141 | 77 |
| 23.75 | 1.2 | 595 | 252 | 58 |
| 30 | 1.15 | 565 | 279 | 51 |
| 45.5 | 1.15 | 1052 | 758 | 28 |
| *28.5 | 1.15 | 985 | 751 | 24 |
| 19 | 1.15 | 948 | 684 | 28 |
| 25.5 | 1.15 | 529 | 131 | 75 |
| 24 | 1.15 | 398 | 67 | 83 |
| 25 | 1.15 | 380 | 77 | 80 |
| 28 | 1.15 | 295 | 40 | 86 |

*The basic compound is added

EXAMPLE 2

A stream of air (0.5 m³/h) contaminated with toluene is passed as in Example 1 through a biofilter packed with a compost/bark mixture. At various times after the moistening with water 10 ml portions of 30% of aqueous ammonia are injected into the stream of air. The effects of these additions on the breakdown efficiency are evident from Table 2.

TABLE 2

| Time (days) | Concentration of hazardous substance [mg/m³] | | Breakdown [%] |
|---|---|---|---|
| | before | after | |
| 2 | 350 | 350 | 0 |
| 3 | 290 | 140 | 52 |
| 4 | 320 | 30 | 91 |
| 5 | 325 | 0 | 100 |
| 6 | 50 | 0 | 100 |
| 7 | 575 | 40 | 93 |
| 8 | 620 | 0 | 100 |
| 9 | 520 | 20 | 96 |
| 10 | 580 | 100 | 83 |
| 11 | 560 | 220 | 61 |
| 12 | 460 | 130 | 72 |
| 13 | 610 | 220 | 64 |
| 14 | 410 | 100 | 76 |
| 15 | 380 | 140 | 73 |
| *16 | 600 | 300 | 50 |
| 17 | 360 | 210 | 42 |
| 18 | 300 | 100 | 67 |
| 19 | 300 | 30 | 90 |
| 20 | 330 | 0 | 100 |
| 21 | 250 | 0 | 100 |
| 22 | 340 | 0 | 100 |
| 23 | 320 | 0 | 100 |
| 24 | 560 | 50 | 91 |
| 25 | 350 | 0 | 100 |
| 26 | 270 | 5 | 98 |
| 27 | 450 | 20 | 96 |
| 28 | 480 | 50 | 90 |
| 29 | 220 | 30 | 86 |
| 30 | 410 | 90 | 78 |
| 31 | 220 | 100 | 55 |
| 32 | 400 | 130 | 68 |
| 33 | 420 | 190 | 55 |
| 34 | 370 | 170 | 54 |
| 35 | 380 | 150 | 61 |
| *36 | 430 | 160 | 63 |
| 37 | 450 | 160 | 64 |
| 38 | 400 | 120 | 70 |
| 39 | 450 | 160 | 64 |
| 40 | 480 | 120 | 75 |
| 41 | 500 | 90 | 82 |
| 42 | 510 | 80 | 84 |
| 43 | 520 | 70 | 87 |
| 44 | 500 | 5 | 99 |
| 45 | 440 | 15 | 97 |
| 46 | 710 | 90 | 87 |
| 47 | 525 | 40 | 92 |
| 48 | 530 | 10 | 98 |
| 49 | 490 | 0 | 100 |
| 50 | 510 | 50 | 90 |
| 51 | 550 | 100 | 82 |
| 52 | 600 | 140 | 77 |
| 53 | 515 | 130 | 63 |
| 54 | 760 | 210 | 82 |
| *55 | 440 | 210 | 52 |
| 56 | 300 | 110 | 63 |
| 57 | 425 | 100 | 76 |
| 58 | 525 | 225 | 57 |
| 59 | 600 | 90 | 85 |
| 60 | 725 | 115 | 84 |
| 61 | 560 | 115 | 79 |
| 62 | 325 | 30 | 91 |
| 63 | 325 | 50 | 85 |
| 64 | 450 | 135 | 70 |
| 65 | 450 | 100 | 78 |
| 66 | 390 | 100 | 74 |
| 67 | 240 | 20 | 92 |
| 68 | 370 | 110 | 70 |
| 69 | 350 | 140 | 60 |
| 70 | 350 | 140 | 60 |

*The basic compound is added

EXAMPLE 3

A stream of air (0.5 m$^3$/h) contaminated with toluene is passed as in Example 1 through a biofilter packed with a compost/active charcoal mixture. At various times after the moistening with water 3 g of gaseous ammonia are added to the stream of air. The effect of these additions on the breakdown efficiency is as described in Table 2.

I claim:

1. A process for the biological disposal and purification of waste air which is contaminated with organic solvent fumes with the aid of biofilters, wherein a basic compound, or mixture of basic compounds, which is in the form of a gas and/or is dissolved in a solvent is added to the contaminated waste air before entry into a biofilter.

2. A process according to claim 1, wherein the contaminated waste air is moistened with water or water vapour, and the basic compound is added before and/or after the moistening.

3. A process according to claim 1, wherein the contaminated waste air is moistened with water or water vapour, and the basic compound is added at the same time.

4. A process according to claim 1, wherein the contaminated waste air is moistened with a basic compound dissolved in water.

5. A process according to claim 1, wherein the solvents used are organic solvents or water.

6. The process according to claim 1, wherein alkali metal and/or alkaline earth metal hydroxides and/or nitrogen-containing compounds are used as basic compounds.

7. The process according to claim 6, wherein ammonia, ammonium compounds and/or amines are used as basic compound.

8. The process according to claim 7, wherein ammonia or aqueous ammonia is added to the waste air after or during the moistening.

9. The process according to claim 1, wherein the basic compound is metered in depending on the pH, with the pH being measured in the biofilter, in the condensate, in the waste water and/or in the purified waste air after it emerges from the biofilter.

10. The process according to claim 1, wherein the contaminated waste air is passed through a separate buffer which is located upstream and/or downstream of the moistening device, upstream and/or downstream of the device for introducing the basic compounds, or else between several biofilters where appropriate.

* * * * *